(No Model.)
G. W. HILL
SURVEYING INSTRUMENT.
No. 256,142. Patented Apr. 11, 1882.
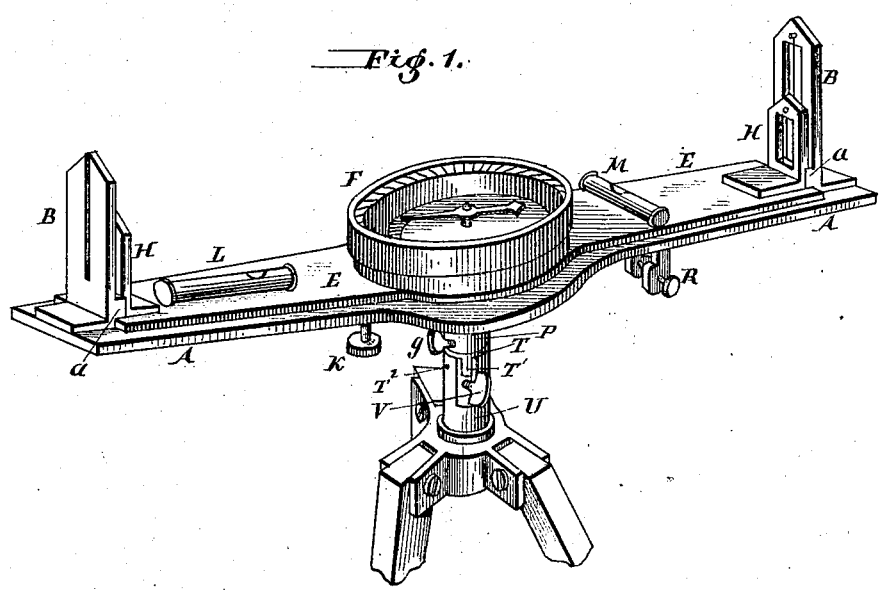
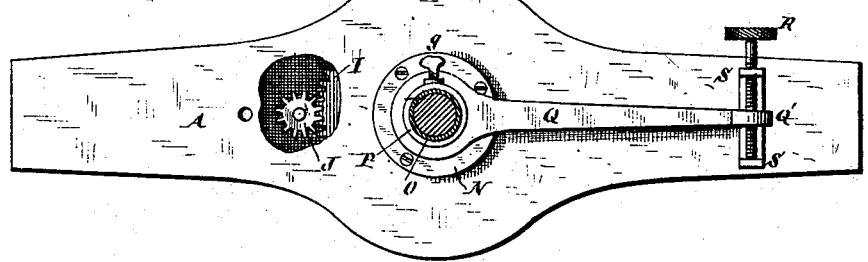
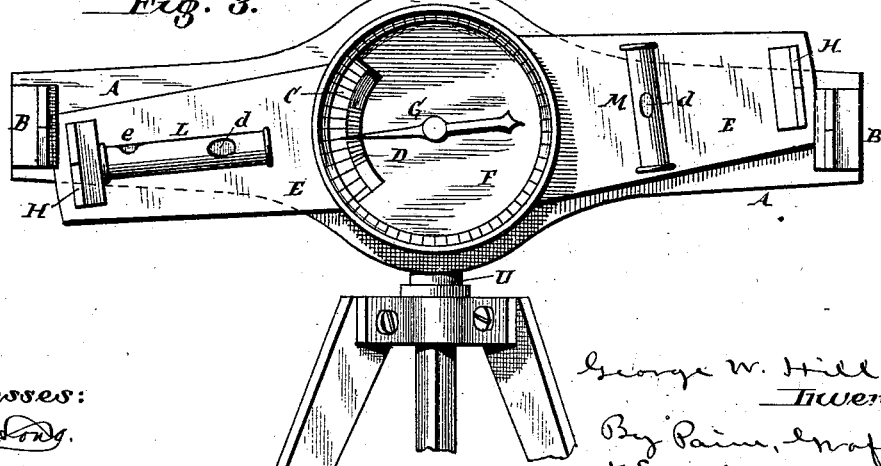
Witnesses:
George W. Hill, Inventor.
By Paine, Crafton & Ladd,
Attorneys

UNITED STATES PATENT OFFICE.

GEORGE W. HILL, OF OLEAN, NEW YORK.

SURVEYING-INSTRUMENT.

SPECIFICATION forming part of Letters Patent No. 256,142, dated April 11, 1882.

Application filed January 7, 1881. (No model.)

*To all whom it may concern:*

Be it known that I, GEORGE W. HILL, a citizen of the United States, residing at Olean, in the county of Cattaraugus and State of New York, have invented certain new and useful Improvements in Circumferentors; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The object of the present invention is to furnish an instrument of simple construction for measuring horizontal and vertical angles with ease and precision.

The invention consists essentially in the combination of upper and lower sight-carrying plates, adjustable in respect to each other, the upper plate being provided with a compass, spirit-levels, and vernier, and the lower plate having a graduated circle arranged in juxtaposition to the vernier of the upper plate. By these means horizontal angles can be measured without shifting the position of the lower plate and taking its sights from the initial or starting point, the upper plate alone being moved to sight the terminal point.

The invention also consists in connecting the instrument with an ordinary tripod or Jacob's staff by a universal hinge-joint, so that the instrument can be rotated or turned into a vertical plane for measuring perpendicular angles.

Certain minor details of construction also form part of the invention.

In the drawings, Figure 1 is a perspective view, representing the instrument in position for measuring horizontal angles. Fig. 2 is a bottom view thereof. Fig. 3 represents the instrument turned down in position for measuring vertical angles.

The letter A designates the lower plate of the instrument, which carries at its outer end a pair of vertical sight-plates, B, of any preferred form of construction. The middle portion of the plate A is made circular, and has engraved thereon or otherwise applied thereto a graduated circle, C, which, in connection with the vernier D of the movable upper plate, E, indicates the angle measured with the instrument. The upper plate, E, has the compass-box F, with its proper magnetic needle G mounted on its middle portion, and is provided at its outer ends with the sight-plates H. The upper plate is made shorter than the lower plate, so that its two ends will revolve under the heels of the outer pair of sights, the latter having lugs *a* on their inner sides for receiving the outer ends of the upper plate when both plates are in line with each other.

The middle portion of the upper plate forming the bottom of the compass-box is provided with a toothed rim, I, into which meshes a pinion, J, carried by a short stem, K, projecting through the bottom plate. By means of this stem and pinion the upper plate, with its attachments, is rotated on the lower plate so as to assume any desired angle in relation thereto.

It will be obvious that after the initial or starting point has been properly observed through the sights of the lower plate the upper plate can be properly adjusted so as to sight the terminal point without disturbing the position of the lower plate. In this manner the angle between the two objects sighted through the sights of the upper and lower plates can be accurately measured. Another advantage arising from this construction consists in obviating all errors by any local attraction of the magnetic needle.

For the purpose of leveling the instrument in a perfect manner in whatever position the same may be placed or used, I provide the upper plate with a pair of spirit-levels, L M, located at the ends of the upper plate, and arranged at right angles to each other in the usual manner. In addition to the customary opening, *d*, for observing the bubble in the spirit-level, I provide the level L with a similar side opening, *e*, for the object hereinafter stated.

The two main plates of the instrument are connected together by means of a disk or small plate, *n*, resting against the lower plate, and provided with a central socket or tube, O, with closed inner end, through which extends the pin of the compass-needle. This socket O of the plate or disk *n* receives a collar or tubular shank, P, the upper end of which carries a longitudinal arm, Q. The free or outer end of this arm is provided with a vertical extension, Q', having a screw-threaded eye through which passes a transverse screw, R, having its bearings in a hanger or yoke, S, secured to the under side of the lower plate.

The tubular shank P of the instrument receives the hinged upper part, T, of a stem, U, which is seated in the upper socket of an ordinary tripod or Jacob's-staff. The hinged or jointed part T of this shank has a circumferential groove turned therein which receives the end of a set-screw, g, fitted in a lug or projection of the tubular shank P. The lower end of the part T is made in the form of a plate, T', and is fitted between bifurcations or ears of the stem U, and jointed thereto by a transverse pin or rivet, T². A turn-button, V, screwed into the stem U, can be turned up against the edge of the plate T' of the part T, so as to hold these parts in a vertical position when the instrument is to be maintained in a horizontal position for the purpose of measuring horizontal angles.

When perpendicular angles are to be measured the upper part, T, is turned down at right angles to the stem U, when by properly loosening the set-screw the tubular shank, together with the instrument attached thereto, is permitted to turn or rotate on the part T of the stem U. When the parts are in this position the upper and lower plates, which may now be termed "outer" and "inner" plates, can be properly adjusted in respect to each other in a vertical plane for the purpose of taking observations through their respective sights. In this instance the side opening of the level L is brought on the top thereof, so as to enable the instrument to be properly leveled. The arm Q and screw R are brought into service after the instrument has been clamped to the part T, in case further adjustment is found necessary for the purpose of bringing the instrument to a perfect level.

The construction herein described will afford simple and effective means for measuring horizontal angles between two given points, when the instrument is in the position shown in Fig. 1, and the provision of the hinge and revolving joints will adapt the instrument for measuring perpendicular angles.

Having thus fully described my invention, what I claim as new, and desire to secure by Letters Patent, is—

In an instrument for measuring angles, the combination of the long plate A, having a graduated central circle and outer pair of sights, B, pivoted with rear lugs, a, and the short plate E, carrying an outer pair of sights, H, and a central compass and vernier, as and for the purpose set forth.

In testimony whereof I affix my signature in presence of two witnesses.

GEORGE W. HILL.

Witnesses:
C. OSMUN CHESTER,
L. D. PERRIN.